United States Patent Office 3,282,970
Patented Nov. 1, 1966

3,282,970
PROCESS OF REACTING EQUIMOLAR AMOUNTS OF A MONOUNSATURATED DIOL, A POLYALKYLENE POLYAMINE, AND A MONOCARBOXYLIC ACID AND PRODUCT
Olen L. Riggs, Jr., Ponca City, Okla., assignor to Continental Oil Company, Ponca City, Okla., a corporation of Oklahoma
No Drawing. Filed Oct. 16, 1962, Ser. No. 230,982
17 Claims. (Cl. 260—404.5)

This invention relates to the retarding or prevention of corrosion of ferrous metals. More particularly, it is concerned with a new and improved composition and method for treating crude oil-brine mixtures to reduce their corrosive action upon production and attendant oil field equipment. Specifically, it relates to the development of a new composition comprising the reaction product of approximately equimolar quantities of a polyalkylene polyamine, an unsaturated alcohol, and a fatty acid, possessing corrosion inhibiting properties.

This application is a continuation-in-part of my copending application Serial No. 47,351 (filed August 4, 1960, now abandoned) which is a continuation-in-part of application Serial No. 772,726, filed November 10, 1958, and now abandoned.

Considerable corrosion takes place in the metallic equipment of oil wells, and in certain environments corrosion may reach costly proportions. For examples, casing, tubing, sucker rods, and lead lines are particularly subject to corrosion. The sucker rods and sucker rod boxes which operate under heavy cyclic load conditions are especially susceptible to failure through corrosion fatigue. As a result of corrosion, costs of operations are greatly increased because of the necessity of pulling tubing and sucker rods for repair and replacement. In addition, indirect costs in terms of production losses while shutdown for repair or replacement are high.

The hydrogen sulfide and carbon dioxide environments typically present in oil well production fluids are to a great extent responsible for the severe corrosion which is known to occur.

It is therefore a principal object of this invention to provide a composition and method for preventing corrosion in oil wells containing crude oil-brine mixtures and a hydrogen sulfide and carbon dioxide environment. Another object of this invention is to provide a substance and method to prevent pitting and blistering of oil well tubing without causing adverse effects on the crude oil. Other objects and advantages will be apparent from the following description.

The corrosion inhibiting composition of this invention may be prepared by reacting approximately equimolar quantities of an unsaturated diol, a polyalkylene polyamine, and an organic acid. Preferably, the inhibitors are formed by reacting one mole of an unsaturated diol with approximately one mole of a polyalkylene polyamine in the presence of a small amount of an ionizable compound of a chelate-forming metal to form a reaction product and about one mole of water, and then reacting said reaction product with about one mole of an organic acid to form a second reaction product and about two moles of water.

THE UNSATURATED DIOL

Suitable unsaturated diols may be defined by the following structural formula:

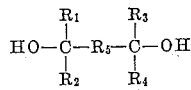

where $R_1$, $R_2$, $R_3$, and $R_4$ are selected from the group consisting of hydrogen, methyl, and ethyl, and $R_5$ is selected from the group consisting of —C≡C— and —CH=CH—. Specific diols include:

2-butynediol-1,4
1-methyl-2-butynediol-1,4
1,4-dimethyl-2-butynediol-1,4
1,1-dimethyl-2-butynediol-1,4
1,1,4,4-tetramethyl-2-butynediol-1,4
1-ethyl-2-butynediol-1,4
1,4-diethyl-2-butynediol-1,4
1,1-diethyl-2-butynediol-1,4
1,1,4,4-tetraethyl-2-butynediol-1,4
1,methyl-1-ethyl-2-butynediol-1,4
1,methyl-4-ethyl-2-butynediol-1,4
1,1-dimethyl-4-ethyl-2-butynediol-1,4
1,1-diethyl-4-methyl-2-butynediol-1,4
1,4-diethyl-1-methyl-2-butynediol-1,4
1,1-dimethyl-4,4-diethyl-2-butynediol-1,4
1,1,4-trimethyl-2-butynediol-1,4
1,1,4-triethyl-2-butynediol-1,4
1,4-dimethyl-1-ethyl-2-butynediol-1,4
1,1,4-trimethyl-4-ethyl-2-butynediol-1,4
1,4-dimethyl-1,4-diethyl-2-butynediol-1,4
1,1,4-triethyl-4-methyl-2-butynediol-1,4

The butenediols corresponding to the above butynediols, as for example, 2-butenediol-1,4; 1,1-dimethyl-2-butenediol-1,4; 1,1,4,4-tetramethyl-2-butenediol-1,4; and 1,4-diethyl-1-methyl-2-butenediol-1,4 to name only a few, are also suitable for preparing the reaction products of this invention.

The butynediols are readily prepared by the condensation of acetylene with aldehydes or ketones in the presence of copper acetylide as taught by Reppe et al. in the United States Patents Nos. 2,232,867 and 2,300,969, while the butenediols may also be readily prepared by partial reduction of the corresponding butynediols by treatment of the butynediol in aqueous alkali with electrolytic zinc in accordance with the United States Patent No. 2,267,749, issued to Reppe et al.

THE POLYALKYLENE POLYAMINE

The suitable polyalkylene polyamine may be structurally represented as

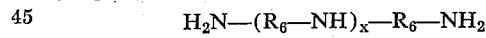

where $R_6$ is a radical selected from the group consisting of ethylene and propylene and $x$ is an integer from 1 to 4, inclusive.

Exemplary but not limitative of the polyalkylene polyamines suitable for preparation of the reaction products of our invention, are diethylene triamine, triethylene tetramine, tetraethylene pentamine, pentaethylene hexylamine, dipropylene triamine, tripropylene tetramine, and tetrapropylene hexylamine.

THE ORGANIC ACID

The suitable organic acids may be represented by the structural formula

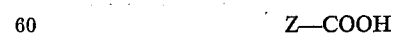

in which Z is a lipophilic group. It is the carboxyl group which actually participates in the reaction; therefore, a wide variety of different acids are suitable. The function of the lipophilic group is to impart oil-solubility to the ultimate corrosion inhibitor product. Monocarboxylic acids are preferred because the polycarboxylic acids will generally yield polymeric products unsuitable for corrosion inhibiting purposes. The preferred acids are the aliphatic and alicyclic (including aromatic) monocarboxylic acids having at least 5 carbon atoms; those having less than 5 carbon atoms generally do not possess lipophilic characteristics of the desired degree. Highly desirable from the standpoint of economic feasibility and availability are the monocarboxylic acids, both saturated and unsaturated, derived from edible fats, tall oil, rosin, etc. Specific acids which may be employed include, by way of example and not by way of limitation, saturated monocarboxylic acids, having at least 5 carbon atoms and preferably 5 to about 20 carbons (valeric, caproic, etc., up through eicosanoic (arachidic) acid). The substituted acrylic acids of from 5 to about 20 carbon atoms, may also be used, as well as other unsaturated acids, such as the pentenoic and hexenoic acids, etc., up through oleic acids, and other unsaturated acids such as naphthylpropiolic, pentynoic, hexynoic, octynoic acid, etc., and sorbic octadienoic and other dienoic acids, etc., including linoleic acid and linolelaidic acids. Although the tendencies of some of the unsaturated acids to polymerize may prove undesirable in some instances, these tendencies may be suppressed by means of suitable inhibitors so that they can be employed, at least in part, for the purpose of lowering the solidification temperature of the product. Acids such as the alkylbenzoic acids, aryl-substituted fatty acids, naphthenic acids and hydroabietic and similar acids derived from rosin may also be employed. It should be understood that acids containing more than 20 carbon atoms are suitable, although not readily available in quantity.

It is obvious that routine experimentation will reveal that many acids will prove suitable in addition to the organic acids mentioned specifically above, and that such materials will prove to be equivalent in the preparation of these corrosion inhibitors. It should also be mentioned that additional lipophilic groups may be attached by other means, for example, by reaction of organic sulfonyl halides with the secondary amine groups in the inhibitor.

PREPARATION OF THE CORROSION INHIBITOR

The corrosion inhibitors of this invention are formed by reacting approximately equimolar quantities of the polyalkylene amine, the unsaturated diol and the organic acid under conditions such as to drive off the water formed in the reaction. The reaction may be carried out by one of three methods: (a) reacting the unsaturated diol with the polyalkylene polyamine, and then reacting the resulting product with the organic acid; (b) reacting the organic acid and the polyalkylene polyamine, and reacting the resulting product with the unsaturated diol; and (c) by mixing the three ingredients and completing the reaction in one step.

In general, methods (a) and (b) are preferable over method (c), method (a) constituting the best mode of preparing the corrosion inhibitors. In carrying out the process of methods (a) and (b), the equimolar quantities of the polyalkylene polyamine and either the organic acid or the unsaturated diol are mixed and brought to the boiling point. In order to remove byproduct water of reaction, benzene or toluene may then be added to the reaction mixture and azeotropic distillation carried out until the temperature rises above the azeotropic temperature, at which time the reaction is complete. The mixture is then cooled and the other ingredient added, after which the temperature is elevated to the boiling point and reaction water again trapped until yield approximates theoretical. In order to make the final product more fluid and to assist in carrying the water overhead, an entrainer such as benzene or toluene may be used during the reaction and distillation.

In carrying out the process in accordance with the best mode, the polyalkylene polyamine and the unsaturated diol are first reacted, in the presence of a small amount of a metal ion, in accordance with the following general procedure.

The unsaturated diol and the polyalkylene polyamine may be simply mixed (preferably in equimolar quantities, but possibly from about ½–2 mole equivalents of amine per mole equivalent of the diol) and the metal compound added thereto. We prefer, however, to dissolve the metal compound in a small quantity of water, and then mix the solution with the diol prior to addition of the amine. The diol is preferably heated slightly to facilitate mixing of the metal compound therewith.

The mixture of diol, amine, and metal compound is then heated slightly to initiate the reaction, in a reaction vessel equipped for the azeotropic removal of water. When the reaction commences, the temperature begins to rise at an accelerated rate, and heating should be discontinued. The water which is formed is trapped and removed and the temperature is allowed to rise slowly until the condensation of water has ceased. After the water of reaction has been removed, the mixture is allowed to cool, an azeotropic solvent such as benzene or toluene is added, and azeotropic distillation conducted to trap out residual water. The solvent is stripped from the mixture after which the then-existing temperature is preferably maintained for about 45 minutes or an hour to ensure completion of the reaction.

As to the metal employed during the reaction of the amine with the diol, several metals are suitable. The selection of the metal compound is preferably made from ionizable compounds of chelate-forming metals, which are those metals other than the alkali, alkaline earth, and lanthanide metals. In general, the best chelate-formers are cations of small size and high nuclear or ionic charges, such as the metals having atomic numbers of 24–30, 42–48, and 74–80, although we may employ metals selected from a somewhat broader group of metals including those having atomic numbers of 22–30, 41–48, 49–50, and 73–83, inclusive. As indicated above, we prefer to use a copper compound. Although chloride salts may be employed, we prefer to use other ionizable compounds such as metal acetates or other compounds of organic acids. A particularly suitable compound is copper acetate.

The amount of metallic compound depends somewhat upon the particular reactants and metal use; for example, titanium is more active than copper and therefore may be employed in smaller quantities. The amount of metal employed affects the rate of reaction, and since the reaction is exothermic, the desired amount will also depend upon the heat transfer characteristics of the equipment in which the reaction is carried out. It has been established, however, that in the case of copper the amount of metal should preferably not exceed about one-half gram of metal ion per mole of the unsaturated diol. If this limit is exceeded, the reaction proceeds very rapidly and the resulting product generally contains an excess of a high molecular weight resinous fraction and therefore lacks certain desired physical characteristics such as viscosity and water solubility. We have also found that mere trace quantities of copper in the order of 5 parts of copper acetate per million parts of diol are effective to promote the desired reaction involving the splitting-off of water to form the condensation product. We generally use from about 5–100, and preferably from about 10–50 parts of copper acetate per million parts of diol. Example 1 illustrates a preferred amount of 50 parts of copper acetate per million parts of diol.

The reaction of the organic acid with the amine-diol reaction product is preferably carried out as follows. The organic acid and the amine-diol reaction product is placed into a reaction vessel equipped for the azeotropic removal of water. The temperature of the mixture is increased until a distillate appears in the trap. The mixture is then cooled and toluene is added. The water of reaction is then removed by azeotropic distillation, after which the toluene is stripped from the product.

The reaction products constituting the corrosion inhibitors of this invention are mixtures of a wide variety of compounds having a broad molecular weight range, and attempts at identification thereof have been unsuccessful.

The inhibitor compounds of this invention may be added to the well fluids by any conventional method; usually by merely injecting the desired amount of the inhibitor into the well. As another method of introducing the inhibitor into the well, a tubing of relatively small diameter may be run down the center of the production tube of the well to approximately the bottom thereof and a solution of the inhibitor may be pumped through the small diameter tubing so as to enter the well stream near the bottom of the well tube. The rising turbulent flow will then carry the injected inhibitor up through the tube. Obviously, the corrosion inhibitor may be added or introduced into the well by another means or method, depending in part on whether the wells are operated through the casing or through tubing disposed in such casings. Also, it is clear that the inhibitors may be introduced into the top of the well and allowed to flow down or it may be forced through any given point or points in the well at which the inhibitor then can come in contact with the turbulent upgoing fluid mixture which, as stated, would cause metal corrosion but for the presence of corrosion inhibitors of this invention. The effective and preferred concentrations of inhibitor are in the ranges approximately 1 to 500 and 5 to 100 parts per million parts of well fluid, respectively, said well fluid comprising crude oil in brine. After separating the brine from the crude oil the resulting crude oil exhibits favorable corrosion inhibiting properties when transporting through connecting pipelines to the refinery.

The corrosion inhibitors of this invention may be introduced into the system as such, or they may be dissolved in a suitable solvent such as mineral oil, crude oil, kerosene, gasoline, organic esters, alcohols, ketones or even water. A significant advantage afforded by the corrosion inhibitors of this invention is their high degree of water dispersibility in comparison with corroson inhibitors of the prior art. This high water dispersibility is believed to exist because of the water-soluble alcohol group present on the end of the side chain of the molecules.

The following examples are set forth to illustrate the best mode of preparing the corrosion inhibitors of this invention, it being understood that they are not to be construed as limiting its scope.

*Example 1*

PREPARATION OF AMINE-DIOL REACTION PRODUCT

Into a 500 ml., 3-necked, round bottom flask, place one mole (86 gm.) of 2-butyne-1,4-diol and 0.86 ml. of a stock solution of copper acetate. (This stock solution consists of 5 gm. of Cu $(C_2H_3O_2)_2H_2O$ dissolved in 1,000 ml. of de-ionized water heated to 50° C.) The temperature is raised to the melting point of the diol (57–58° C.). while stirring, to mix in the copper. To the warm solution add one mole of tetraethylene pentamine (189 grams) while continuing to stir the mixture. Raise the temperature to 180° C. and hold. Water begins to distill over at approximately 170° C. Continue distillation until 18–20 ml. of distillate has been trapped. Cool ingredients to 70° C. and add 30 ml. toluene for azeotrope of remaining water. Raise the temperature. Azeotropic distillation begins at approximately 134° C. Trap and remove water only as thimble fills. The temperature will slowly rise with removal of residual water. As the temperature reaches 190° C., measure the water (it should be near 16 ml. volume). Continue to let the temperature rise as toluene is stripped free of the reaction product. The temperature should not be allowed to exceed about 225° C. A few ml. of a yellow distillate will be trapped out in the toluene at temperatures between 190° C.–225° C. The product forms a bright, clear solution in water.

REACTION OF THE AMINE-DIOL REACTION PRODUCT WITH THE ORGANIC ACID 282 grams of oleic acid are added to the amine-diol reaction product in the flask. The temperature is increased. At about 170° C. a distillate appears in the trap. The temperature is then reduced to about 70° C. and 100 ml. of toluene is added to the flask. The water of reaction is then removed by azeotropic distillation at about 165° C. About 35–36 ml. of water will ordinarily be trapped. The toluene is then stripped from the reaction product.

The final reaction product forms a bright, clear solution in a hydrocarbon such as kerosene.

*Example 2*

To 88 grams of 2-butene-1,4-diol, add 0.002 gram $CuCl_2$. Using a standard reflux apparatus, weigh into the flask 189 grams of tetraethylene pentamine. Raise the temperature to about 145° C., hold for about one hour, and then allow to cool. Add 50 ml. benzene or toluene and raise the temperature for refluxing and azeotroping. About 17 ml. of water should be collected. Add 282 grams of oleic acid, raise the temperature to about 190° C., and hold for about one hour. Cool, then add toluene and azeotrope the mixture at reflux temperature until about 35 ml. of water has been trapped.

*Example 3*

To 88 grams of 2-butene-1,4-diol add 0.43 ml. of copper acetate stock solution. Using a standard reflux apparatus weigh into the flask 232 grams of pentaethylene hexylamine. Raise the temperature to about 150° C. and hold for about one hour, then allow the mixture to cool. Add 50 ml. of benzene or toluene and raise the temperature for refluxing and azeotroping. About 17 ml. of water should be collected. Add 282 grams of oleic acid to the mixture in the flask, and raise the temperature to about 190° C. and hold for about one hour. Cool the mixture and then add toluene and azeotrope at reflux temperatures until about 35 ml. of water has been trapped.

*Example 4*

To 88 grams of 2-butene-1,4-diol add 0.43 ml. of copper acetate stock solution. Using a standard reflux apparatus weigh into the flask 189 grams of tetraethylene pentamine. Raise the temperature to about 145° C. and hold for about one hour, then allow the mixture to cool. Add 50 ml. of benzene or toluene and raise the temperature for refluxing and azeotroping. About 17 ml. of water should be collected. Add 282 grams of oleic acid to the mixture in the flask, and raise the temperature to about 190° C. and hold for about one hour. Cool the mixture and then add toluene and azeotrope at reflux temperatures until about 35 ml. of water has been trapped.

*Example 5*

To 87 grams of 2-butyne-1,4-diol add 0.86 ml. of copper acetate stock solution. Using a standard reflux apparatus weigh into the flask 232 grams of pentaethylene hexylamine. Raise the temperature to about 150° C. and hold for about one hour, then allow the mixture to cool. Add 50 ml. of benzene or toluene and raise the temperature for refluxing and azeotroping. About 17 ml. of water should be collected. Add 282 grams of oleic acid to the mixture in the flask, and raise the temperature to about 200° C. and hold for about one hour. Cool the mixture and then add toluene and azeotrope at reflux temperatures until about 35 ml. of water has been trapped.

*Example 6*

To 87 grams of 2-butyne-1,4-diol add 0.17 ml. of 0.5% aqueous solution of $CoCl_2 \cdot 6H_2O$. Using a standard reflux apparatus weigh into the flask 60 grams of ethylene diamine. Raise the temperature to about 135° C. and hold for about one hour, then allow the mixture to cool.

Add 50 ml. of benzene or toluene and raise the temperature for refluxing and azeotroping. About 17 ml. of water should be collected. Add 102 grams of valeric acid to the mixture in the flask, and raise the temperature to about 180° C. and hold for about one hour. Cool the mixture and then add toluene and azeotrope at reflux temperatures until about 35 ml. of water has been trapped.

*Example 7*

To 88 grams of 2-butene-1,4-diol add 0.09 ml. of 0.5% aqueous solution of $TiCl_4$. Using a standard reflux apparatus weigh into the flask 60 grams of ethylene diamine. Raise the temperature to about 135° C. and hold for about one hour, then allow the mixture to cool. Add 50 ml. of benzene or toluene and raise the temperature for refluxing and azeotroping. About 17 ml. of water should be collected. Add 102 grams of valeric acid to the mixture in the flask, and raise the temperature to about 180° C. and hold for about one hour. Cool the mixture and then add toluene and azeotrope at reflux temperatures until about 35 ml. of water has been trapped.

*Example 8*

To 87 grams of 2-butyne-1,4-diol add 0.09 ml. of a 0.5% aqueous solution of $SnCl_2 \cdot 2H_2O$. Using a standard reflux apparatus weigh into the flask 232 grams of pentaethylene hexylamine. Raise the temperature to about 150° C. and hold for about one hour, then allow the mixture to cool. Add 50 ml. of benzene or toluene and raise the temperature for refluxing and azeotroping. About 17 ml. of water should be collected. Add 284 grams of stearic acid to the mixture in the flask, and raise the temperature to about 200° C. and hold for about one hour. Cool the mixture and then add toluene and azeotrope at reflux temperatures until about 35 ml. of water has been trapped.

*Example 9*

To 88 grams of 2-butene-1,4-diol add 0.43 ml. of a 0.5% aqueous solution of $MnCl_2 \cdot 4H_2O$. Using a standard reflux apparatus weigh into the flask 189 grams of tetraethylene pentamine. Raise the temperature to about 145° C. and hold for about one hour, then allow the mixture to cool. Add 50 ml. of benzene or toluene and raise the temperature for refluxing and azeotroping. About 17 ml. of water should be collected. Add 284 grams of stearic acid to the mixture in the flask, and raise the temperature to about 200° C. and hold for about one hour. Cool the mixture and then add toluene and azeotrope at reflux temperatures until about 35 ml. of water has been trapped.

*Example 10*

To 87 grams of 2-butyne-1,4-diol add 1.7 ml. of copper acetate stock solution. Using a standard reflux apparatus weigh into the flask 302 grams of pentapropylene hexylamine. Raise the temperature to about 150° C. and hold for about one hour, then allow the mixture to cool. Add 50 ml. of benzene or toluene and raise the temperature for refluxing and azeotroping. About 17 ml. of water should be collected. Add 282 grams of oleic acid to the mixture in the flask, and raise the temperature to about 200° C. and hold for about one hour. Cool the mixture and then add toluene and azeotrope at reflux temperatures until about 35 ml. of water has been trapped.

*Examples 11–20*

Employing the same reactants and procedure as in Example 5, use the following metal salts in place of copper acetate:

| Example No. | Metal Salt | Quantity of 0.5% Aqueous Solution, ml. |
|---|---|---|
| 11 | $MoBr_4$ | 0.43 |
| 12 | $AgF$ | 0.20 |
| 13 | $Cd\,SO_4.4H_2O$ | 0.43 |
| 14 | $TaF_5$ | 0.10 |
| 15 | $WO_2Cl_2$ | 0.10 |
| 16 | $PtCl_4.8H_2O$ | 0.10 |
| 17 | $AuOH$ | 0.10 |
| 18 | $Hg(NO_3)_2.\frac{1}{2}H_2O$ | 0.43 |
| 19 | $Pb_2(C_2H_3O_2)_3\,OH$ | 0.86 |
| 20 | $Bi\,PO_4$ | 0.43 |

The following procedure is used to determine the efficiency of the corrosion inhibitor compositions of this invention, first in a carbon dioxide environment, and then in an environment containing hydrogen sulfide and carbon dioxide. A large mouth bottle of about 250-ml. capacity is charged with 150 ml. of a 5 percent solution of sodium chloride and 50 ml. of kerosene containing the corrosion inhibiting composition. The bottom is agitated to distribute the corrosion inhibitor between the two phases, a weighed 1-inch by 3-inch, 10–20 mild carbon steel coupon inserted, and bottle stopper fitted on. The carbon dioxide or mixture of hydrogen sulfide and carbon dioxide is bubbled through the solution so as to directly expose the coupon to the corrosive action of the particular gas employed. The carbon dioxide is employed at about 7 p.s.i.g. at a rate of about 0.5 liter per minute. The mixture of hydrogen sulfide and carbon dioxide consists of about 0.5 liter per minute of hydrogen sulfide and 1.2 liters per minute of carbon dioxide. Each coupon is exposed to the brine and the $CO_2$ or $H_2S-CO_2$ gas for about 44 hours, after which the coupon is removed from the bottle, descaled by scrubbing with a nylon bristled brush and a cleaning powder, weighed, and its loss in weight determined. The same technique is followed to obtain a blank in the absence of corrosion inhibitor. The percent protection is calculated as follows:

$$P.C.P. = \frac{(Wb_i - Wb_f) - (Wc_i - Wc_f)}{(Wb_i - Wb_f)} \times 100$$

where:

P.C.P.=percent protection afforded by inhibitor
$Wb_i$=initial weight of coupon subjected to test in the absence of inhibitor
$Wb_f$=final weight of coupon subjected to test in the absence of inhibitor
$Wc_i$=initial weight of coupon subjected to test in presence of inhibitor
$Wc_f$=final weight of coupon subjected to test in the presence of inhibitor The results obtained vary somewhat depending upon the particular reactants used to prepare the inhibitor, and the concentration of inhibitor employed. In general, the higher molecular weight reactants are preferred because they are more effective at low concentrations. For example, inhibitors prepared in accordance with Examples 1–5 and 8–10, inclusive, being prepared from the higher molecular weight reactants, usually afford 90+ percent protection at concentrations of 5 parts per million and 95+ percent protection at 50 p.p.m., whereas the inhibitors prepared with the lower molecular weight reactants such as in Examples 6 and 7 require about 100 p.p.m. to provide protection of 90 percent.

It is obvious that many variations may be made in the products and processes of this invention without departing from the spirit and scope thereof as defined in the appended claims.

I claim:
1. A process which comprises:
   (a) reacting approximately equimolar quantities of an unsaturated diol of the formula

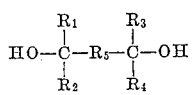

where $R_1$, $R_2$, $R_3$, and $R_4$ are selected from the group consisting of hydrogen, methyl, and ethyl, and $R_5$ is selected from the group consisting of —C≡C— and —CH=CH—, with a polyalkylene polyamine of the formula

where $R_6$ is a radical selected from the group consisting of ethylene and propylene and $x$ is an integer from 1 to 4, inclusive, in the presence of a small amount of an ionizable compound of a chelate-forming metal, whereby about one mole of water, per mole of said diol, is formed and removed during the course of the reaction; and then (b) reacting the product of step (a) with about one mole of an organic acid selected from the group consisting of aliphatic and alicyclic monocarboxylic acids having at least 5 carbon atoms, and aromatic monocarboxylic acids, whereby about two moles of water, per mole of said acid, is formed and removed during the course of the reaction.

2. The reaction product formed in accordance with claim 1.

3. The process of claim 1 wherein the unsaturated diol is 2-butyne-1,4-diol, the polyalkylene polyamine is tetraethylene pentamine, and the organic acid is oleic acid.

4. The process of claim 3 wherein the ionizable metal compound is a copper compound.

5. The process of claim 1 wherein the unsaturated diol is 2-butyne-1,4-diol, the polyalkylene polyamine is pentaethylene hexylamine, and the organic acid is oleic acid.

6. The process of claim 5 wherein the ionizable metal compound is a copper compound.

7. A process which comprises:
(a) reacting approximately equimolar quantities of an unsaturated diol of the formula

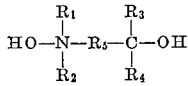

where $R_1$, $R_2$, $R_3$, and $R_4$ are selected from the group consisting of hydrogen, methyl, and ethyl, and $R_5$ is selected from the group consisting of —C≡C— and —CH=CH—, with a polyalkylene polyamine of the formula

where $R_6$ is a radical selected from the group consisting of ethylene and propylene and $x$ is an integer from 1 to 4, inclusive, at approximately the boiling point of the reactants and in the presence of a small amount of an ionizable compound of a chelate-forming metal, the amount of said compound being sufficient to initiate a reaction whereby about one mole of water, per mole of said diol, is formed and removed as a by-product during the course of the reaction; and then (b) reacting the product of step (a) with about one mole of an organic acid selected from the group consisting of aliphatic and alicyclic monocarboxylic acids having from 5 to 20 carbon atoms, and aromatic monocarboxylic acids, at a temperature whereby about two moles water, per mole of said acid, is formed and removed during the course of the reaction.

8. The process of claim 7 wherein the unsaturated diol is 2-butyne-1,4-diol, the polyalkylene polyamine is tetraethylene pentamine, and the organic acid is oleic acid.

9. The process of claim 8 wherein the ionizable metal compound is a copper compound.

10. The process of claim 7 wherein the unsaturated diol is 2-butyne-1,4-diol, the polyalkylene polyamine is pentaethylene hexylamine, and the organic acid is oleic acid.

11. The process of claim 10 wherein the ionizable metal compound is a copper compound.

12. The product formed in accordance with the process of claim 9.

13. The product formed in accordance with the process of claim 11.

14. The method of preparing a corrosion inhibiting composition comprising the steps of:
(a) Adding about 1 mole of tetraethylene pentamine to about 1 mole of 2-butyne-1,4-diol containing from about 10–500 parts of copper acetate per million parts of diol, raising the temperature to initiate an exothermic reaction and to cause the formation of about one mole of by-product water of reaction, and trapping and removing said water; and then
(b) Adding about 1 mole of oleic acid to the reaction product of step (a), raising the temperature to initiate a reaction and to cause the formation of about two moles of by-product water of reaction, and trapping and removing said water.

15. The method of preparing a corrosion inhibiting composition comprising the steps of:
(a) Adding about 1 mole of pentaethylene hexylamine to about 1 mole of 2-butyne-1,4-diol containing from about 10–500 parts of copper acetate per million parts of diol, raising the temperature to initiate an exothermic reaction and to cause the formation of about one mole of by-product water of reaction, and trapping and removing said water; and then
(b) Adding about 1 mole of oleic acid to the reaction product of step (a), raising the temperature to initiate a reaction and to cause the formation of about two moles of by-product water of reaction, and trapping and removing said water.

16. The method of preparing a corrosion inhibiting composition comprising the steps of:
(a) Adding about 1 mole of tetraethylene pentamine to about 1 mole of 2-butyne-1,4-diol containing from about 10–500 parts of copper acetate per million parts of diol, raising the temperature to initiate an exothermic reaction and to cause the formation of about one mole of by-product water of reaction, trapping and removing said water of reaction, refluxing the mixture and conducting azeotropic distillation thereof in the presence of an azeotropic solvent to remove residual water of reaction, and stripping the solvent from the reaction product; and then
(b) Adding about 1 mole of oleic acid to the reaction product of step (a), raising the temperature to initiate a reaction and to commence the formation of about two moles of by-product water of reaction, refluxing the mixture and conducting azeotropic distillation thereof in the presence of an azeotropic solvent to remove the water of reaction, and stripping the solvent from the reaction product.

17. The method of preparing a corrosion inhibiting composition comprising the steps of:
(a) Adding about 1 mole of pentaethylene hexylamine to about 1 mole of 2-butyne-1,4-diol containing from about 10–500 parts of copper acetate per million parts of diol, raising the temperature to initiate an exothermic reaction and to cause the formation of about one mole of by-product water of reaction, trapping and removing said water of reaction, refluxing the mixture and conducting azeotropic distillation thereof in the presence of an azeotropic solvent to remove residual water of reaction, and stripping the solvent from the reaction product; and then
(b) Adding about 1 mole of oleic acid to the reaction product of step (a), raising the temperature to initiate a reaction and to commence the formation of about two moles of by-product water of reaction, refluxing the mixture and conducting azeotropic distillation thereof in the presence of an azeotropic solvent to remove the water of reaction, and stripping the solvent from the reaction product.

References Cited by the Examiner

UNITED STATES PATENTS

| | | | |
|---|---|---|---|
| 2,819,284 | 1/1958 | Shen | 260—309.6 |
| 2,878,234 | 3/1959 | Peterson | 260—47 |
| 2,889,334 | 6/1959 | Hughes | 260—309.6 |
| 2,894,908 | 7/1959 | Newcombe et al. | 252—8.55 |
| 2,917,376 | 12/1959 | Stromberg et al. | 44—63 |
| 2,940,927 | 6/1960 | Hughes | 252—8.55 |

CHARLES B. PARKER, *Primary Examiner.*

H. B. GUYNN, A. H. SUTTO, *Assistant Examiners.*